(12) United States Patent
Wulfhorst et al.

(10) Patent No.: US 9,548,575 B2
(45) Date of Patent: Jan. 17, 2017

(54) DEVICE FOR FIXING AND ELECTRICAL CONTACTING A FACING ELEMENT OF AN AIRCRAFT ON A SUPPORT STRUCTURE

(71) Applicant: Airbus Defence and Space GmbH, Ottobrunn (DE)

(72) Inventors: Leonardo Wulfhorst, Hamburg (DE); Nils Ischdonat, Hamburg (DE); Patrick Rollfink, Hamburg (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/925,745

(22) Filed: Oct. 28, 2015

(65) Prior Publication Data

US 2016/0126684 A1   May 5, 2016

(30) Foreign Application Priority Data

Oct. 31, 2014   (EP) ..................... 14191356

(51) Int. Cl.
*H01R 33/00* (2006.01)
*H01R 13/73* (2006.01)
(Continued)

(52) U.S. Cl.
CPC ............... *H01R 13/73* (2013.01); *B64C 1/066* (2013.01); *B64F 5/0009* (2013.01);
(Continued)

(58) Field of Classification Search
CPC .................. H01R 2002/02; H01R 2201/26
(Continued)

(56) References Cited

U.S. PATENT DOCUMENTS 4,869,670 A * 9/1989 Ueda .................... B60R 16/0207
174/72 A
5,527,187 A * 6/1996 Jurasek ................ H05K 1/0271
439/246
(Continued)

FOREIGN PATENT DOCUMENTS

DE      19730323 A1    1/1998
DE   102010045590 A1    3/2012
(Continued)

*Primary Examiner* — Phuong Dinh
(74) *Attorney, Agent, or Firm* — Hoffmann & Baron, LLP

(57) ABSTRACT

A device for fixing and electrical contacting of a facing element of an aircraft on a support structure, which is attached to an aircraft structure including a fixing device for detachable fixation of the facing element on the support structure and a contacting device for providing multiple electrical contacts between facing element leads and connecting leads on the support structure, wherein the fixing device can be placed into positive engagement by a transitory relative movement between the facing element and the support structure, and the contacting device includes at least two first contacts on the facing element and the same number of second contacts on the support structure cooperating therewith, which can be respectively brought into contact with one another electrically during the transitory relative movement, wherein the first contacts are connected with the facing element leads and the second contacts are connected with the connecting leads on the support structure.

16 Claims, 15 Drawing Sheets

(51) Int. Cl.
*B64C 1/06* (2006.01)
*B64F 5/00* (2006.01)
*H01R 13/26* (2006.01)
*H01R 13/627* (2006.01)

(52) U.S. Cl.
CPC .......... *B64D 2221/00* (2013.01); *H01R 13/26* (2013.01); *H01R 13/6275* (2013.01); *H01R 2201/26* (2013.01)

(58) Field of Classification Search
USPC ......................................................... 439/34
See application file for complete search history.

(56) References Cited

U.S. PATENT DOCUMENTS

| | | |
|---|---|---|
| 5,931,682 A | 8/1999 | Takiguchi et al. |
| 2013/0280953 A1 | 10/2013 | Radeke et al. |
| 2013/0313367 A1 | 11/2013 | Voss et al. |

FOREIGN PATENT DOCUMENTS

| | | |
|---|---|---|
| DE | 102011009815 A1 | 8/2012 |
| EP | 1783870 A1 | 5/2007 |
| WO | WO 93/20601 | 10/1993 |
| WO | WO 99/62146 | 12/1999 |

\* cited by examiner

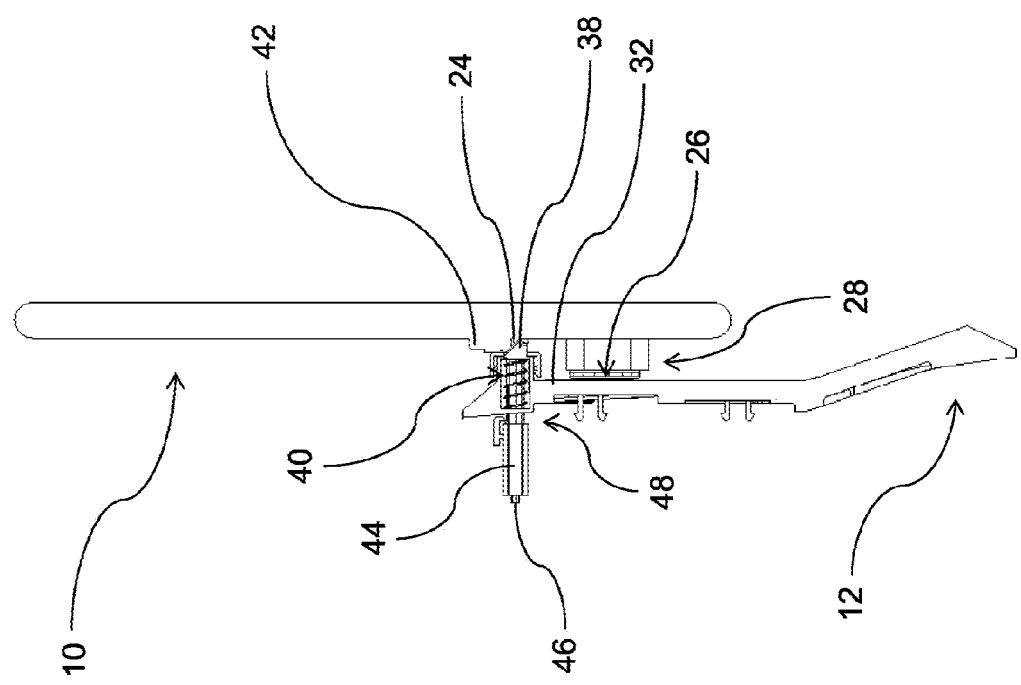

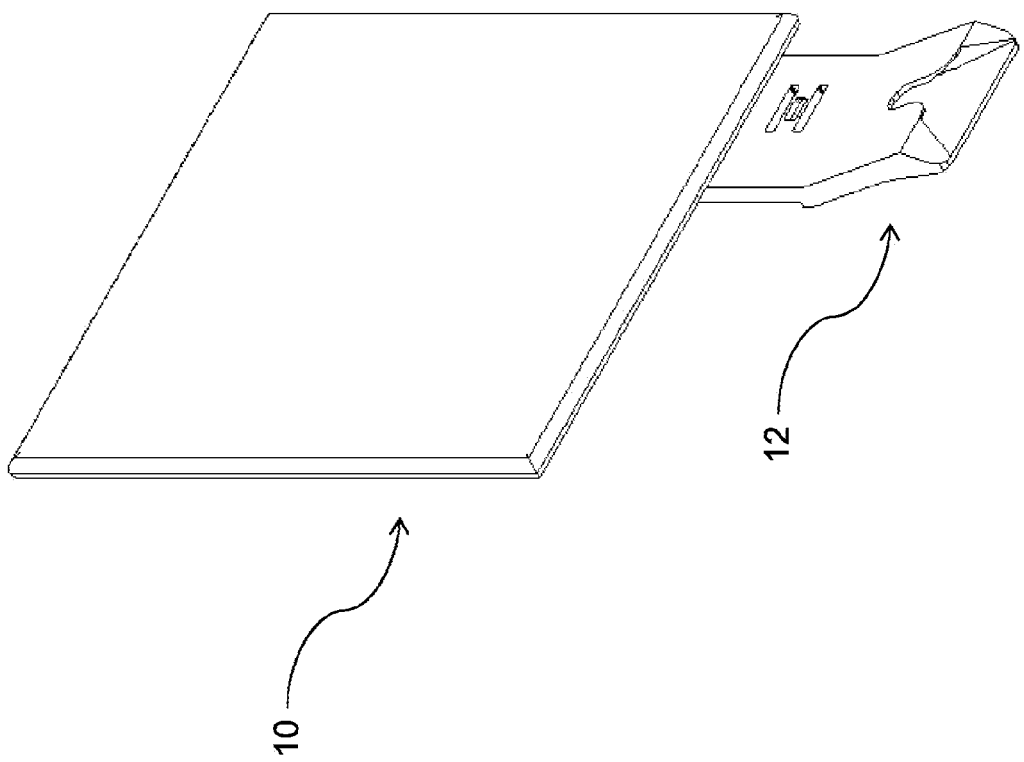

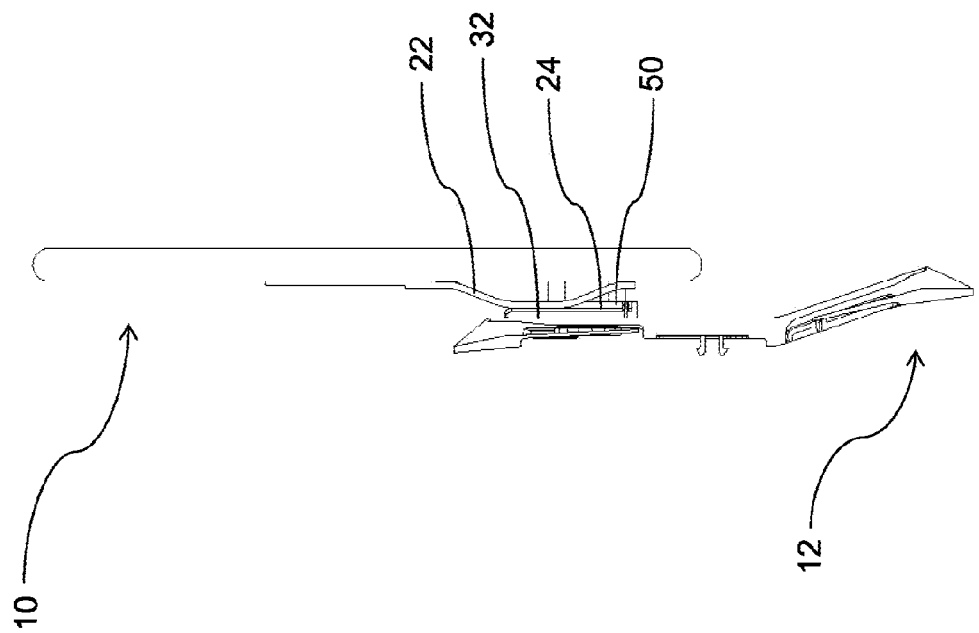

DEVICE FOR FIXING AND ELECTRICAL CONTACTING A FACING ELEMENT OF AN AIRCRAFT ON A SUPPORT STRUCTURE

CROSS-REFERENCE TO RELATED APPLICATION

This application claims priority to and benefit of European Patent Application No. 14 191 356.6, filed 31 Oct. 2014, the contents of which are incorporated herein by reference in their entirety.

BACKGROUND

Field

The invention relates to a device for fixing and electrical contacting a facing element of an aircraft on a support structure, which is attached to a structure of the aircraft.

Brief Discussion of Related Art

Category-defining devices are known in the prior art. Presently, interior components of an aircraft, for example facing elements, light strips, luggage racks, etc., are normally attached individually onto a support structure, which on its part in turn is disposed on a structure of the aircraft. In addition to a straight mounting system, modern interior components frequently require additional connections to a power supply line and/or data supply line, which is typically developed as part of an aircraft onboard system. The printed specification DE 10 2011 009 815 A1 publishes an aircraft interior component system, comprising an aircraft interior component, a first structure retainer, which is attached to an element of the aircraft structure, as well as a first component retainer attached to the aircraft interior component and which is complementary to the first component retainer. According to the disclosure, the aircraft interior component system is characterized in that the aircraft interior component comprises at least one supply line section that is connected with a first connection device disposed on the aircraft interior component, wherein the first connection device is configured to interact with a second connection device complementary to the first connection device to connect the supply line section of the aircraft interior component with a corresponding supply line section of the aircraft. The printed specification DE 10 2010 026 683 A1 publishes an interior component support system for use during the assembly of aircraft interior components in an aircraft, comprising a retaining system with at least one retaining element, on which a first connection device for the connection of the retaining element with a first aircraft interior component and a second connection device are disposed, wherein a structure retainer is further provided on the retaining element for attaching the retaining element to an aircraft structure. Therefore devices ensue from the cited prior art, which can be attached to an aircraft structure by means of respective retaining systems, and, at least in the printed specification DE 10 2011 009 815 A1, include supply connections that are designed for connection to an onboard supply system of an aircraft.

The interface between the aircraft supply system and the corresponding interior components is normally designed as plug-in connection, which within the scope of final assembly of the aircraft generates extra assembly expense, wherein the respective plug-in connections are frequently located in difficult to access areas, which is an aggravating factor.

SUMMARY

Therefore the object of the invention is to indicate a device which avoids the aspects stated in the prior art to the extent possible, i.e., to disclose a device, which, apart from attaching an aircraft interior component to a support structure of an aircraft makes it possible to produce a connection to an aircraft supply system as result of the attachment without causing additional assembly costs therefor.

The invention results from the features of the independent claims. Advantageous developments and embodiments are subject of the dependent claims.

The object is solved with a device for fixing and electrical contacting of a facing element of an aircraft to a support structure, which is attached to an aircraft structure, comprising a fixing device for detachable fixation of the facing element on the support structure and a contacting device for providing multiple electrical contacts between facing element leads and connecting leads on the support structure in that the fixing device can be engaged form-closed by means of a transitory relative movement between facing element and support structure, and the contacting device has at least two first contacts on the facing element and the same number of second contacts on the support structure cooperating therewith, which contacts can respectively make reciprocal contact during the transitory relative movement, wherein the first contacts are connected with the facing element leads and the second contacts are connected with the connecting leads on the support structure. According to the invention, a form-closed engagement is obtained by a transitory relative movement between the facing element and the support structure, which engagement attaches the facing element to the support structure. The form-closed engagement is designed detachable to ensure that the facing element can be replaced easily. At the same time, an electrical connection between the first contacts on the facing element and the second contacts on the support structure is established by means of a contacting device, so that no additional assembly steps are necessary, such as establishing separate plug-in connection in poorly accessible installation spaces. The first contacts are connected with facing element leads, which are advantageously continued to a point of use on the facing elements, for example for the electrical actuation of blinds. The second contacts are connected with leads on the support structure that are connected via the support structure to an electrical onboard system on the aircraft.

In an advanced aspect of the invention, the facing element is designed as cover panel, in particular as a side panel. In this embodiment, a device according to the invention is particularly suitable for interior facing of an aircraft cabin, wherein depending on the specific need a different number of contacts is preferably disposed on the fairing element. It is therefore conceivable, for example, that during an application of the device according to the invention for interior facing of a passenger area of an aircraft cabin more contacts have to be disposed than for an application for interior facing of a cargo area, since increased demand for electrical feed lines is to be expected in a passenger area because of the multifarious entertainment and comfort activities.

A first preferred embodiment of the invention provides that the support structure is realized as supporting plate with an undercut vertical groove and that an insertable fixing element with a head that can be brought into the undercut area is disposed on the facing element. For this purpose the fixing element is preferably designed such that because of its head-like external geometry it can be accurately inserted into the undercut vertical groove by means of a vertical transitory relative movement and upon reaching a final assembly position establishes a positive engagement with the supporting plate. In addition, in this first preferred embodiment the contacting device comprises multiple elastically protruding first contacts disposed on the head, which are designed and set up such that they interact complimentary with multiple second contacts that are attached on a back face of the vertical groove. By virtue of the elastic protrusion of the first contacts, an elastic counterforce builds up in the positive engagement of the facing element with the supporting plate, as a result of which the first contacts on the facing element are pressed counterforce-like onto the second contacts on the support structure.

In the first preferred embodiment, the second contacts on the support structure are preferably shaped in the form of strips, favoring establishing contact during vertical transitory relative movement of the facing element to the support structure in direction of translation. In addition this results in the advantage that the electrical contact is made not only upon reaching the final assembly position of the facing element in the support structure but already before, so that any potential component tolerances can be compensated.

It is furthermore advantageous if the second contacts on the facing element are positioned in longitudinal grooves which are formed in a back face of the vertical groove. In this manner, the first contacts on the facing element obtain the required installation space in their complementary mating part on the support structure, so that the facing element does not project additionally in direction of the area of the aircraft that is to be covered.

Equally advantageously the first contacts on the facing element are shaped like a bow, as a result of which their elastic action and thus the counterforce is increased during the positive engagement of the first contacts on the second contacts.

Finally, in the first embodiment of the invention the first contacts on the facing element are connected with contact pins, which extend into an internal area of the facing element where they are detachably connected with the leads on the facing element. This will create a central electrical supply point on the facing element for flexible access from any position of the facing element by adaptation of the facing element leads.

A second preferred embodiment of the invention provides that the contacting device on the support structure comprises at least one non-conductive sloping component, on which multiple adjacently disposed first contacts are attached, which are connected with the support structure leads. Also in this instance again it follows that a central current distribution discharge point is advantageous, which is flexibly educible by means of routing the support structure leads to satisfy requirements. In the second preferred embodiment of the invention, the sloping component is moreover movable transversely to the direction of the translatory motion against a retractive force, wherein by the retractive force, analog to the first preferred embodiment of the invention, further second contacts on the facing element are pressed onto the first contacts on the support structure when the positive engagement between facing element and support structure is accomplished.

In the second embodiment of the invention, the protective force is preferably produced by a return spring attached on the sloping component, as a result of which the retractive force can be adjusted as required simply by variation of the spring stiffness. Moreover, a return spring can be replaced quickly should the retractive force diminish during the service life and no longer meets specifications.

More preferably, the first contacts on the facing element are disposed on a projection attached to the facing element, said projection having an inclined surface, the surface of which is aligned parallel to the contact surface of the sloping element on the support structure. As a result of such type of design, the contact surface is geometrically maximized and favors the formation of positive engagement between support structure and facing structure, ensuring a fail-safe current transfer between support structure and facing element.

Also preferably, the sloping element on the support structure comprises a shaft from the free end of which contact pins project that are connected with the first contacts. In this context, the shaft end and the contact pins are detachably connected with one another, while the connector in turn is connected with the facing element leads. Advantageously, the shaft and the connector are provided with a T-shaped internal profile, making it possible that connector and shaft can interlock only if the facing element and support structure are in a specific position to one another, as a result of which an intuitive installation is ensured and the risk of incorrect electrical contacting can thus be excluded. Ideally, the connector has a locking hook on its outside, which is designed and set up such that during the interlocking of shaft and connector it establishes a positive and non-positive engagement with a detent lug that is located on the shaft and is formed complementarily to the locking hook, by means of which the final assembly status between facing element and support structure is fixed.

Finally, the second preferred embodiment of the invention is characterized in that the number of the first contacts on the facing element corresponds to the number of the second contacts on the support structure.

The problem is furthermore solved with a third preferred embodiment of the invention, which provides that the contacting device on the facing element comprises a number of first contacts extending in the direction of translation, which are bow-shaped elastically deformable and that a same number of second contacts are located on the support structure extending in direction of translation, which contacts are also attached in guide ducts aligned in direction of translation. The guide ducts serve for guiding the first contacts on the facing element during a transitory relative movement between the facing element and the support structure onto the second contacts and facilitate establishing an electrically conductive connection between facing element and support structure. For this purpose, the extension of the first and second contacts in direction of translation ensures that an electrical contact between facing element and support structure exists already before the final assembly position is reached.

Also advantageously, the bow-shaped first contacts on each one end are fixed on the facing element and bear on the facing element on each other end. In this manner, manufacturing tolerances in the position of the guide ducts on the support structure can be reciprocally balanced and thereby facilitate reliable contact characteristics.

Finally the fixing device is positioned respectively between at least one first and one second contact and thereby facilitates a mirror image alignment of the respective contact pairs to one another.

Further advantages, features and particulars result from the subsequent description, which describes particulars of at least one embodiment in detail by referring to the drawing, if necessary. Identical, similar and/or parts which have the same function are designated with the same reference symbols.

BRIEF DESCRIPTION OF THE DRAWINGS

In the drawings:

FIG. 2a is a vertical section of a second preferred embodiment of a device according to the invention for illustrating the general mode of operation;

FIG. 2e is an isometric view of a second preferred embodiment of a device according to the invention in the assembled state, as a front view;

FIG. 3a is a vertical section of a third preferred embodiment of a device according to the invention to illustrate the general mode of operation;

DETAILED DESCRIPTION

Figure 1A:
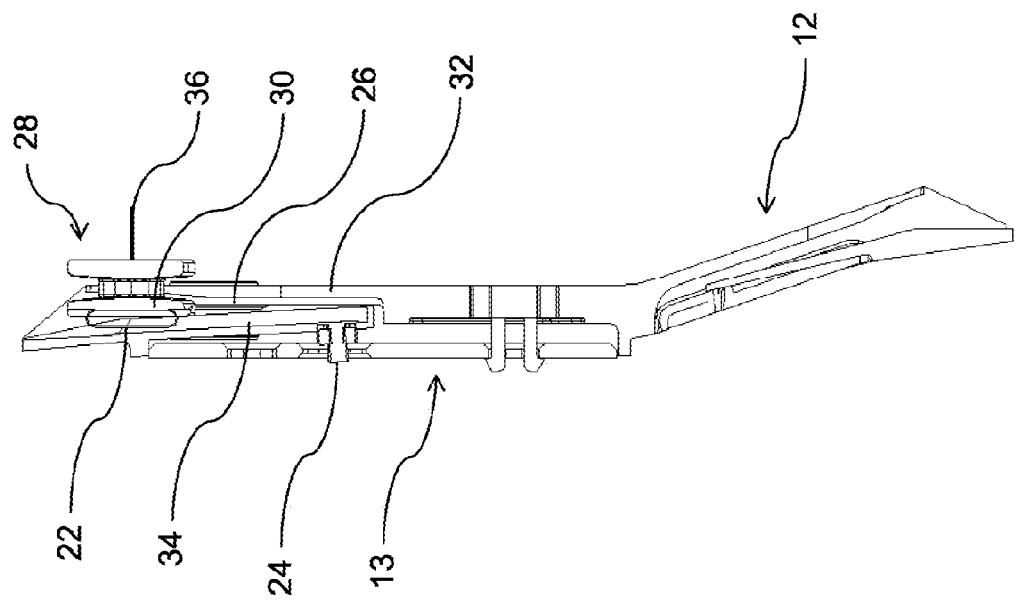
FIG. 1a is a vertical section of a first preferred embodiment of a device according to the invention to illustrate the general mode of operation.
Figure 1B:
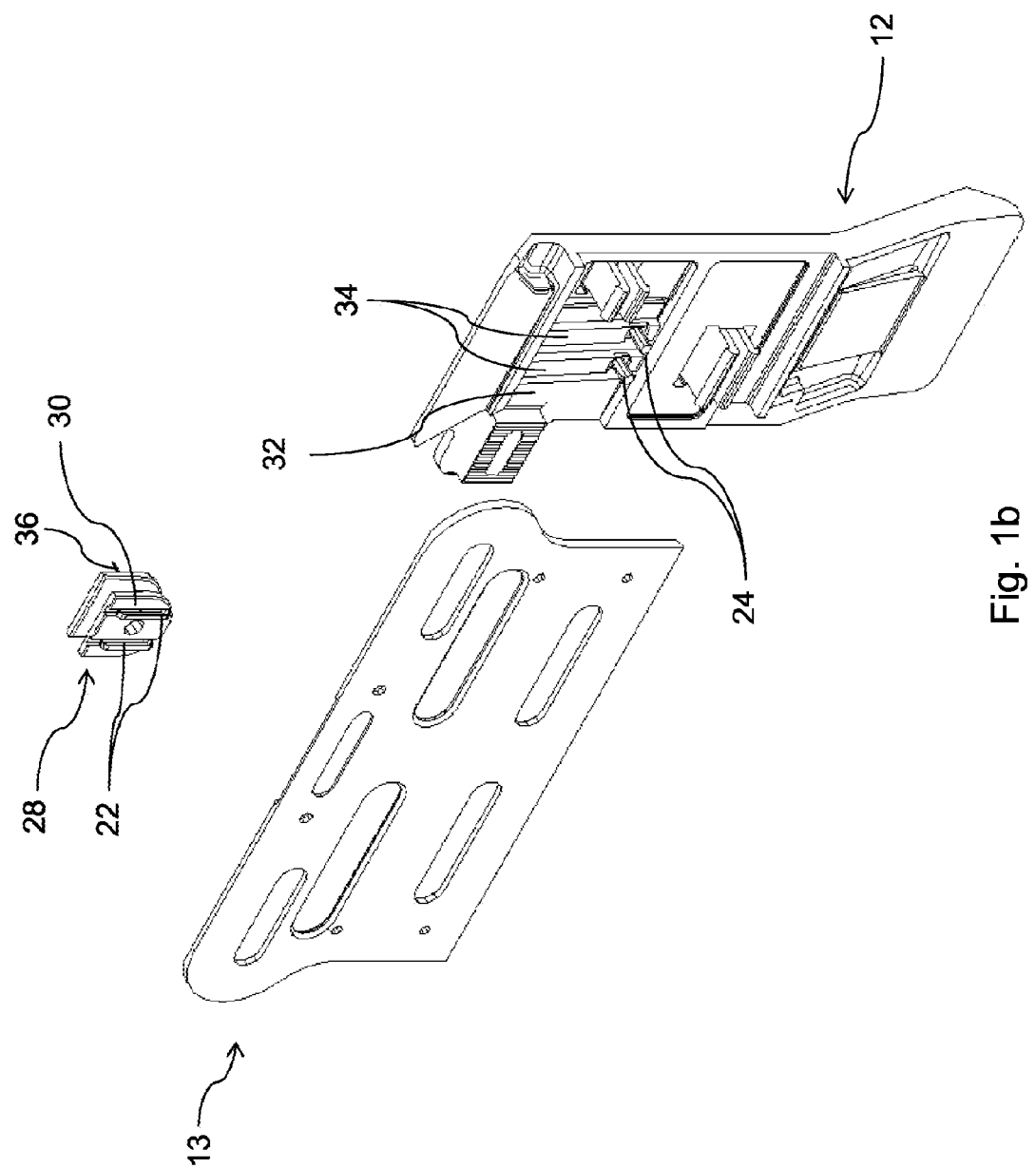
FIG. 1b is an isometric exploded view of a first preferred embodiment of a device according to the invention, as a rear view.
Figure 1C:
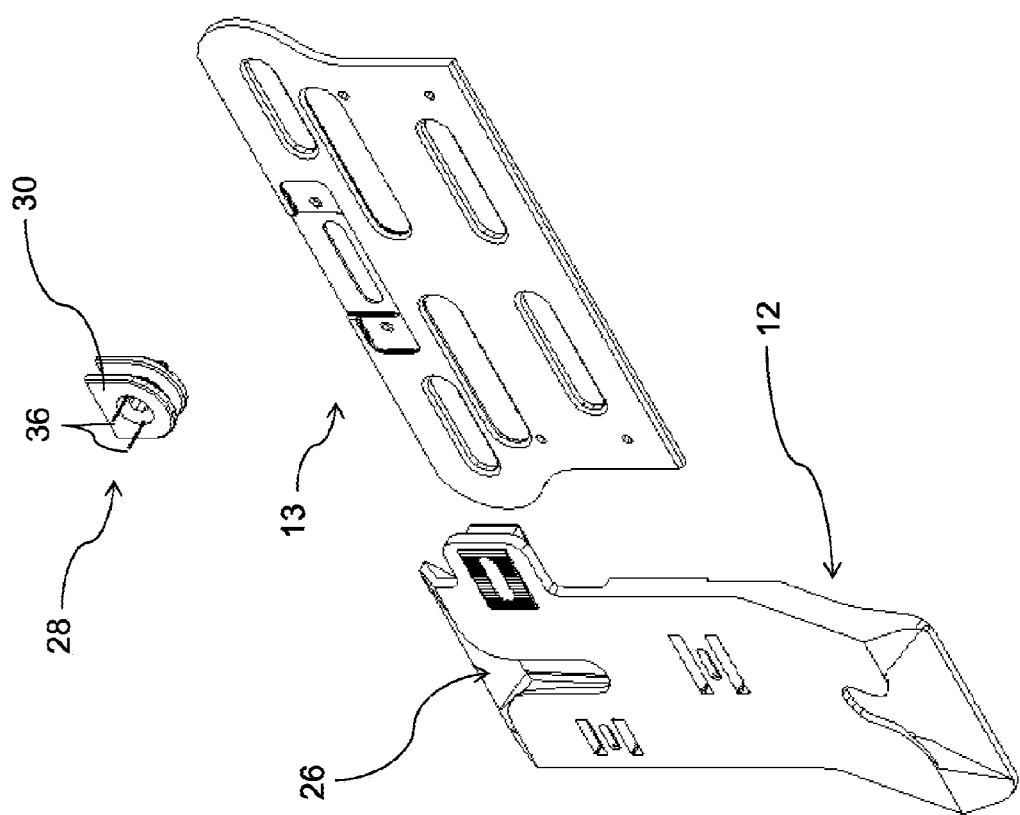
FIG. 1c is an isometric exploded view of a first preferred embodiment of a device according to the invention, as a front view.
Figure 1D:
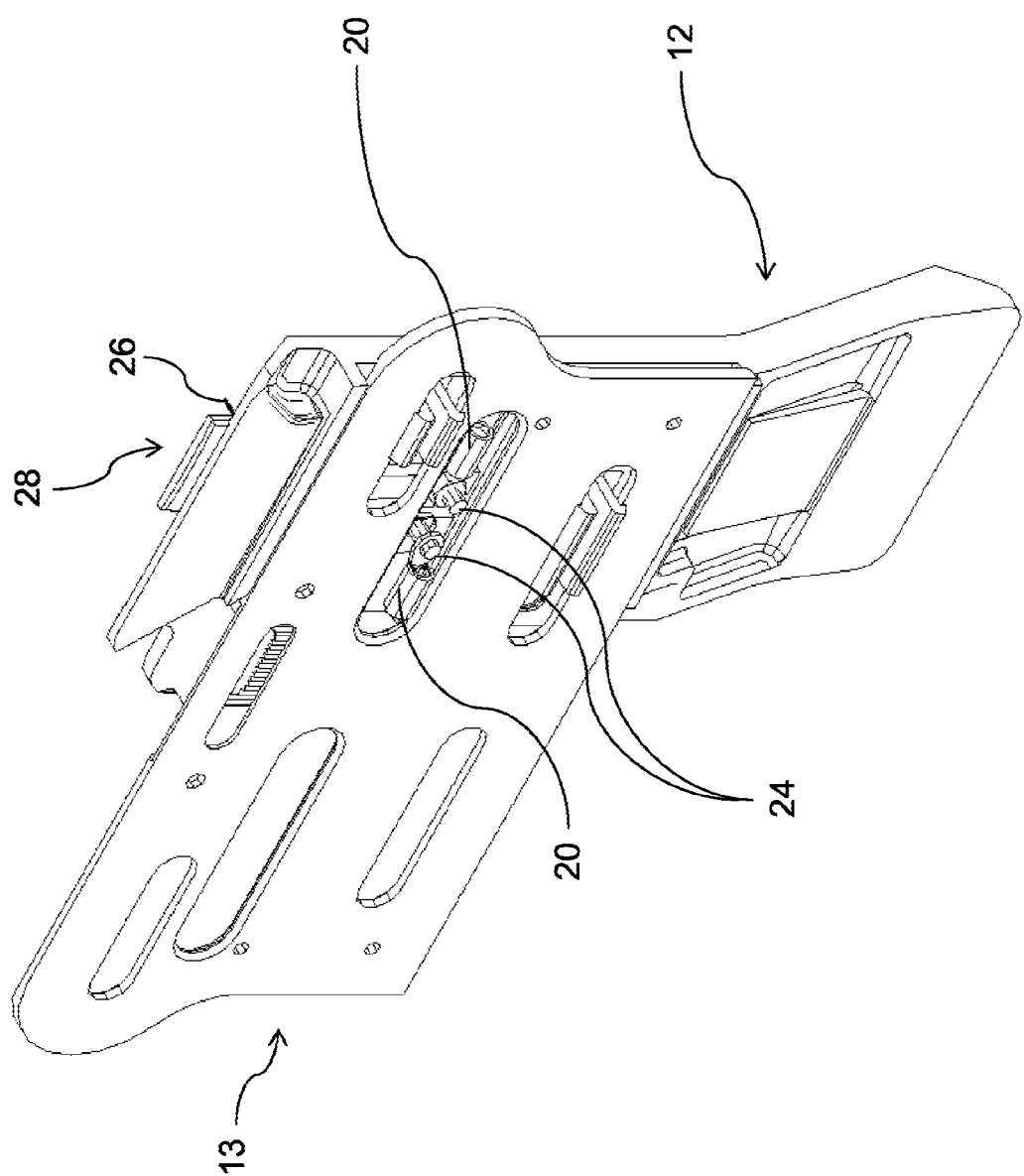
FIG. 1d is an isometric view of a first preferred embodiment of a device according to the invention in the assembled state, as a rear view.
Figure 1E:
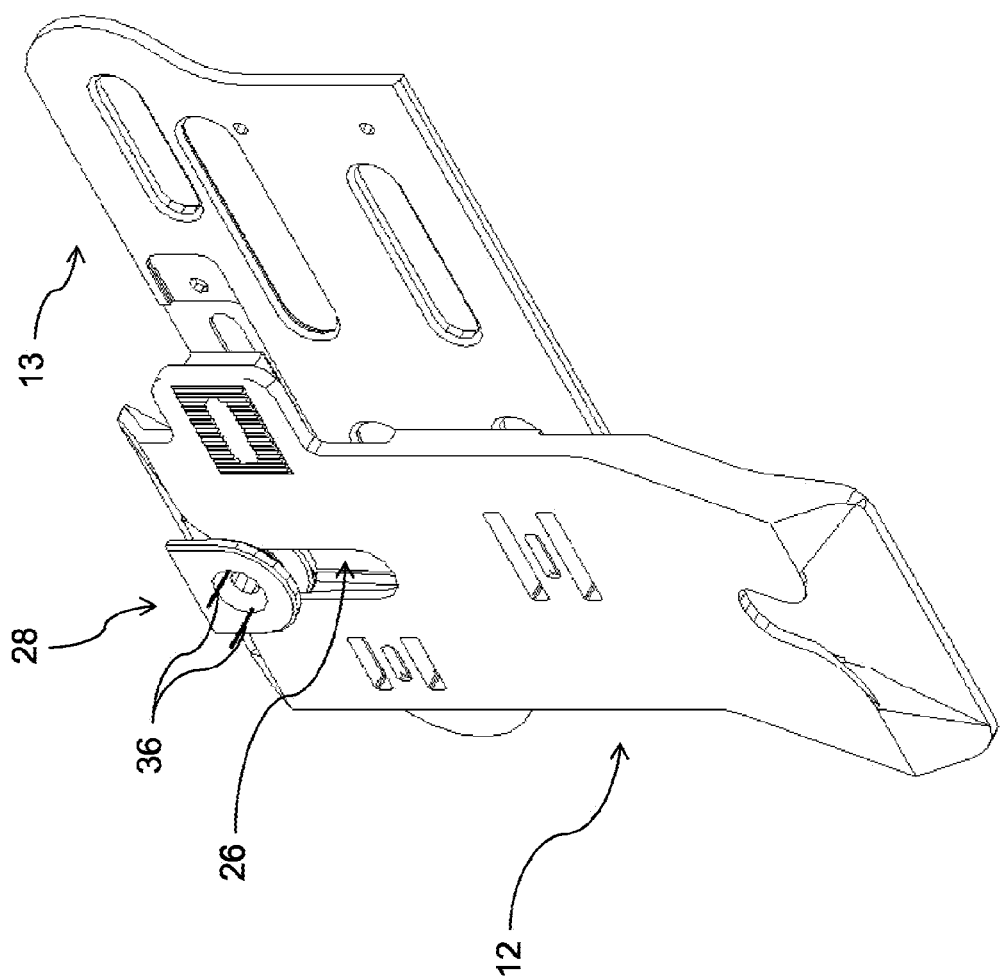
FIG. 1e is an isometric view of a first preferred embodiment of a device according to the invention in the assembled state, as a front view.

In FIG. 1a the general mode of operation of a first preferred embodiment of a device according to the invention is presented as a vertical section. A support structure 12 is adjoined positively and non-positively onto an aircraft structure 13 and serves as flange material for receiving a fixing element 28 that is preferably accomplished and developed as sliding block. By means of a central guide, which is advantageously 11.5 mm wide and is positioned in the support structure 12, the fixing element 28 which preferably has a 10 mm diameter and is preferably formed as slide block is guided transitorily in vertical direction with a 1.5 mm fitting tolerance and upon reaching a final assembly position is fixed by means of a positive joint in the support structure 12. The aircraft structure 13 is a type of base plate, which is fixed on an aircraft component, in particular on a frame, by means of riveted joint, screwed joint or welded joint. The fixing element in turn on its part is fixed on a facing element 10, not shown in FIG. 1a, which closes the aircraft structure 13 in direction of an aircraft cabin as facing panel, preferably as side panel. Such a side panel is presented in the printed specification DE 10 2011 009 815 U1, for example. Advantageously four fixing elements 28 are disposed on the facing element 10 not presented in FIG. 1a, which fixing elements can be positively engaged with four support structures 12, wherein the four support structures 12 are respectively attached individually, alternatively also in pairs on the aircraft structure 13 positively and non-positively. The fixing element 28 further comprises a head 30, which is constituted such that it can be positively engaged with an undercut vertical groove 26 disposed on a back face 32 of the support structure 12 by transitory relative movement of the support structure 12 to the fixing element 28 and in this manner establishes a positive engagement between the fixing element 28 and the support structure 12. To sustain the increased mechanical loads associated with the described functionality of the positive engagement, the material of the support structure 12 is thickened or structurally reinforced on the force-transmitting joints, preferably by additional stiffening ribs. In addition, in the assembled state a gap exists between the facing element 10, not illustrated in FIG. 1a, and the support structure 12, which in direction of a yaw axis of the aircraft is overlapped towards the bottom by a second facing element, which is preferably designed as dado panel. Multiple first contacts 22, which are advantageously designed bow-shaped elastically, are disposed on the head 30 and thus on the facing element. With the first contacts 22 further contact pins (36) are connected in the fixing element 28, which contact pins extend into an inner section of the facing element 10 not illustrated in FIG. 1a and are connected there with facing element leads 18, which cannot be seen in FIG. 1a either, advantageously by means of THT or SMT soldering methods, as a result of which a current supply is provided. Alternatively it is conceivable to provide electrical contacting between the fixing element 28 and the facing element 10, not illustrated in FIG. 1a, by means of contact sockets with integrated contact pins disposed in a socket of the fixing element 28, wherein the contact sockets feed the contact pins of the fixing element 28 in the facing element 10 not illustrated in FIG. 1a. The first contacts 22 further correspond with strip-shaped second contacts 24, which are disposed in the back face 32 of the vertical groove 26 on the support structure and which establish electrical contact between the fixing element 28 and the support structure 12 during transitory relative movement of the support structure 12 to the fixing element 28. Preferably, the second contacts 24 are attached to the support structure 12 in longitudinal grooves 34 on the back face 32 with screw connections using set screws on the support structure, as a result of which not only do they not require additional installation space and stop the facing element from projecting further in direction of the aircraft cabin, but they also compensate the structural braces or reinforcements on force-transmitting positions of the support structure 12 in the direction of the aircraft cabin. The second contacts 24 of the support structure on the back face 32 of the support structure are advantageously connected via spade terminals, alternatively via connectors, with connecting leads 20 on the support structure, which are also not visible in FIG. 1a, which connectors are in turn connected to an aircraft onboard system from which they receive electrical power, which can be transmitted by means of the electrical contacting of the support structure 12 with the fixing element 28 to same or to the facing element that is connected with the fixing element 28. The second contacts 24 on the rear of the support structure are protected against contact and short-circuit by means of an insulating cover clamped onto the second contacts 24. Due to the strip-shaped embodiment of the second contacts 24 and the first contacts 22 bow-shaped in direction of translation, the electrical contact is made between the support structure 12 and the fixing element 28 in the undercut vertical groove 26 already before a final assembly position of the fixing element 28 is reached, wherein because of the elasticity of the bow shape the first contacts 22 are pushed against the second contacts 24 and the electrical contact is maintained reliably by the described spring action of the bow shape of the first contacts 22, even during mechanical loading of the device according to the invention. In an exploded view FIG. 1b and FIG. 1c illustrate the respective components necessary for the functionality of the first preferred embodiment of a device according to the invention, while FIG. 1d and FIG. 1e present the exemplified concept of the first preferred embodiment of a device according to the invention in the assembled state.

Figure 2B:
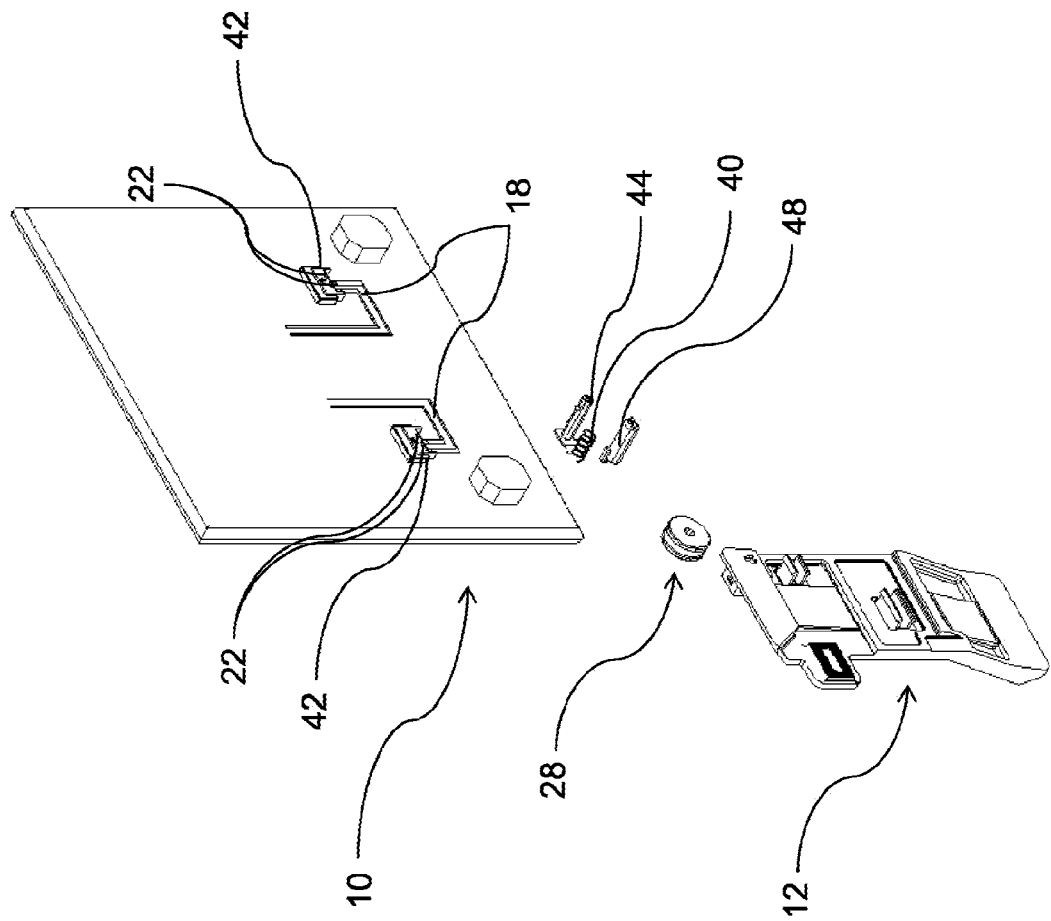
FIG. 2b is an isometric exploded view of a second preferred embodiment of a device according to the invention, as a rear view.
Figure 2C:
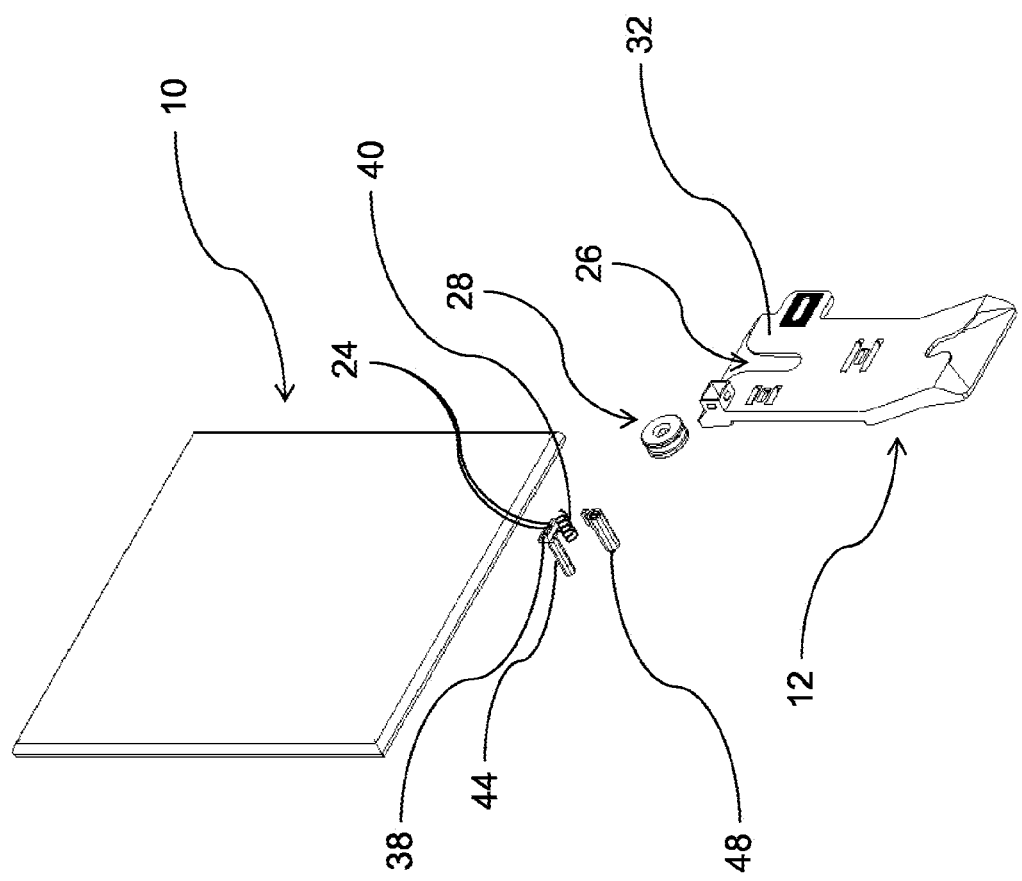
FIG. 2c is an isometric exploded view of a second preferred embodiment of a device according to the invention, as a front view.
Figure 2D:
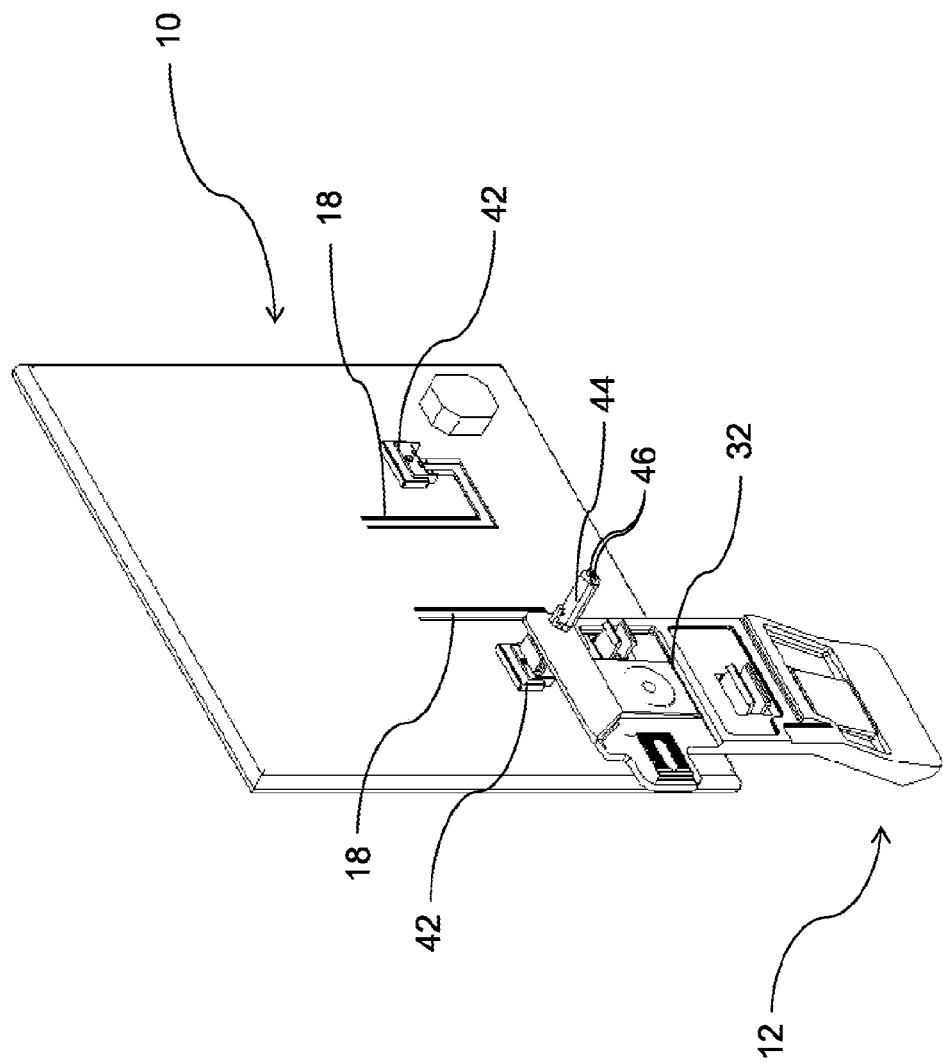
FIG. 2d is an isometric view of a second preferred embodiment of a device according to the invention in the assembled state, as a rear view.

FIG. 2a illustrates the general mode of operation of an alternative second preferred embodiment of a device according to the invention, again as a vertical section. Analog to the first preferred embodiment of a device according to the invention, in this refinement a positive engagement between the facing element 10 and the support structure 12 is established by means of a fixing element 28 on which a facing element 10 is disposed by transitory relative movement of the fixing element 28 to a support structure 12, again with a 1.5 mm fitting tolerance in horizontal direction, which support structure on its part is in turn attached by positive and non-positive engagement to an aircraft structure 13 that is not presented in FIG. 2a. Also in this second preferred embodiment of a device according to the invention all power-transmitting component parts on the support structure 12 are mechanically reinforced. The electrical contacting between support structure 12 and facing element 10 is by means of at least one sloping element 38, which is disposed on the support structure and is designed non-conductive. On the sloping element 38, second contacts 24 are affixed, which on their part are again connected with connecting leads 20 on the support structure that are not visible in FIG. 2a. In this context, the sloping element 38 is preferably movable transversely to the direction of translation against a retractive force that is produced by a return spring 40. Preferably, the sloping element 38 has a shaft 44 from the free end of which connector pins 46 project, which during a positive engagement between support structure 12 and fixing element 28 interact with first contacts 22 on the facing element, which are advantageously attached by screw connections to a projection 42 designed as contact socket equipped with an inclined surface that is complementary to the sloping element 38 and establish an electrical contact, which is secured by the retractive force of the return spring 40. For this purpose, one end of the shaft 44 and the connector pins 46 are detachably connected to one another by means of a connector 48, wherein the connector 48 in turn is connected to facing element leads 18 that are not visible in FIG. 2a. To safeguard against incorrect contacting, the shaft 44 and the connector 48 are provided with a T-shaped internal profile which makes it possible for the connector 48 and shaft 44 to interlock reciprocally only when facing element 10 and support structure 12 are in a certain position to one another. In addition the connector 48 has a locking hook on its outside, wherein the locking hook establishes a positive and non-positive engagement during the interlocking of shaft 44 and connector 48 with a detent lug that is located on the shaft 44 complementarily to the locking hook, by means of which engagement the final assembly status between facing element 10 and support structure 12 is fixed. In this second preferred embodiment of the invention, the first contacts 22 on the facing element are also connected with facing element leads 18 that are not presented in FIG. 2a. FIG. 2b and FIG. 2c again illustrate an exploded view of the components of the second preferred embodiment of a device according to the invention illustrated in FIG. 2a, while an assembled version is illustrated in FIG. 2d and FIG. 2e.

Figure 3B:
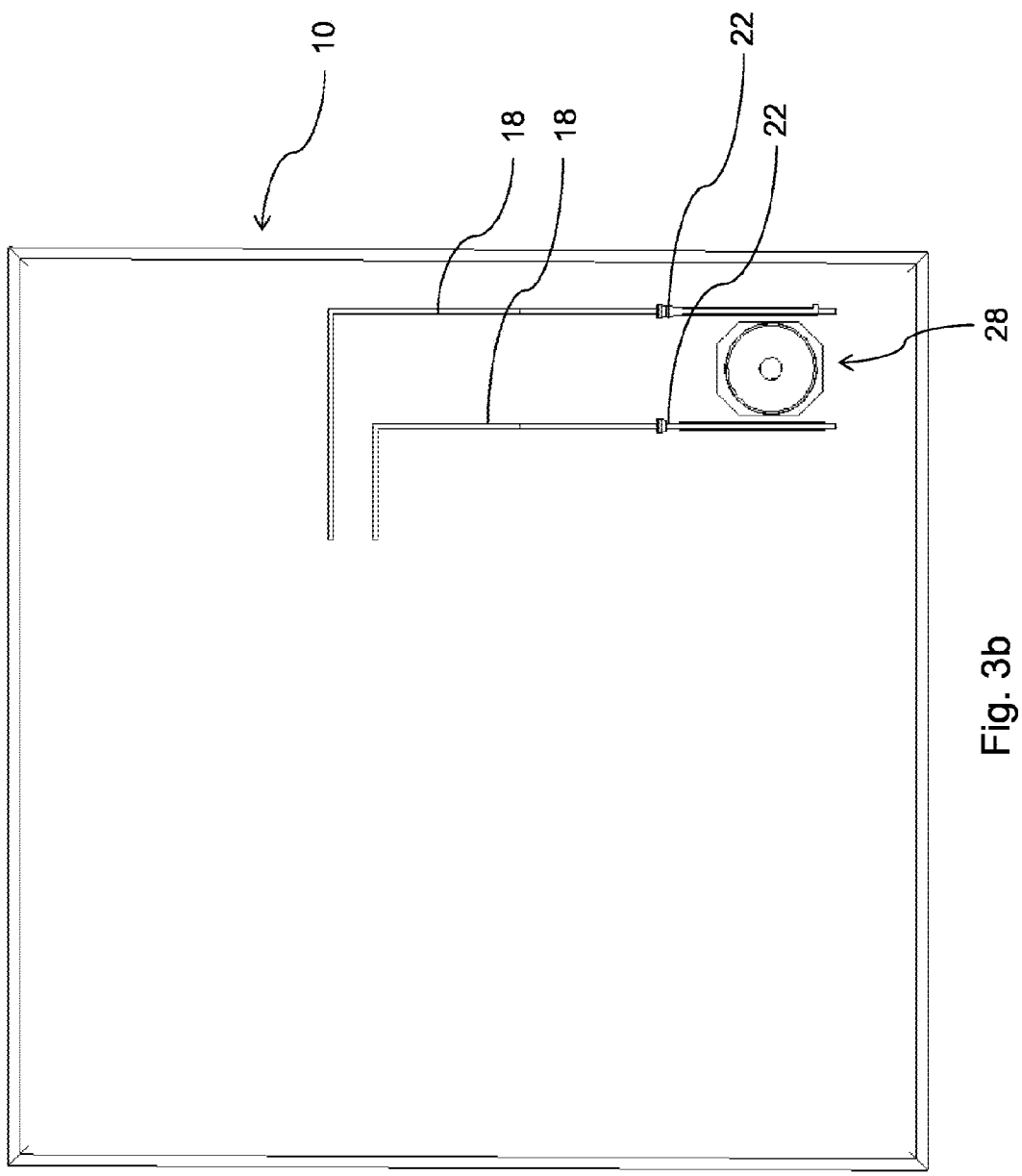
FIG. 3b is a facing element as component part of a third preferred embodiment of a device according to the invention, as a rear view.
Figure 3C:
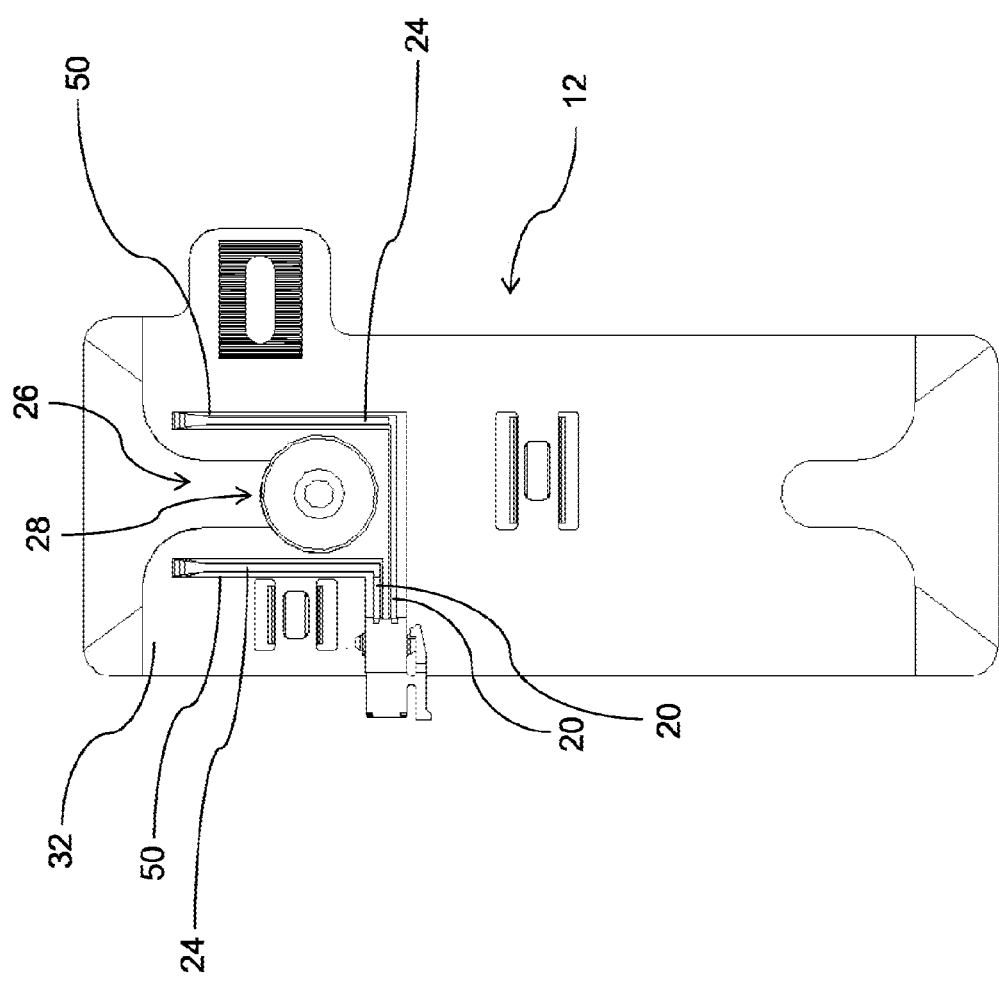
FIG. 3c is a support structure as component part of a third preferred embodiment of a device according to the invention, as a front view.
Figure 3D:
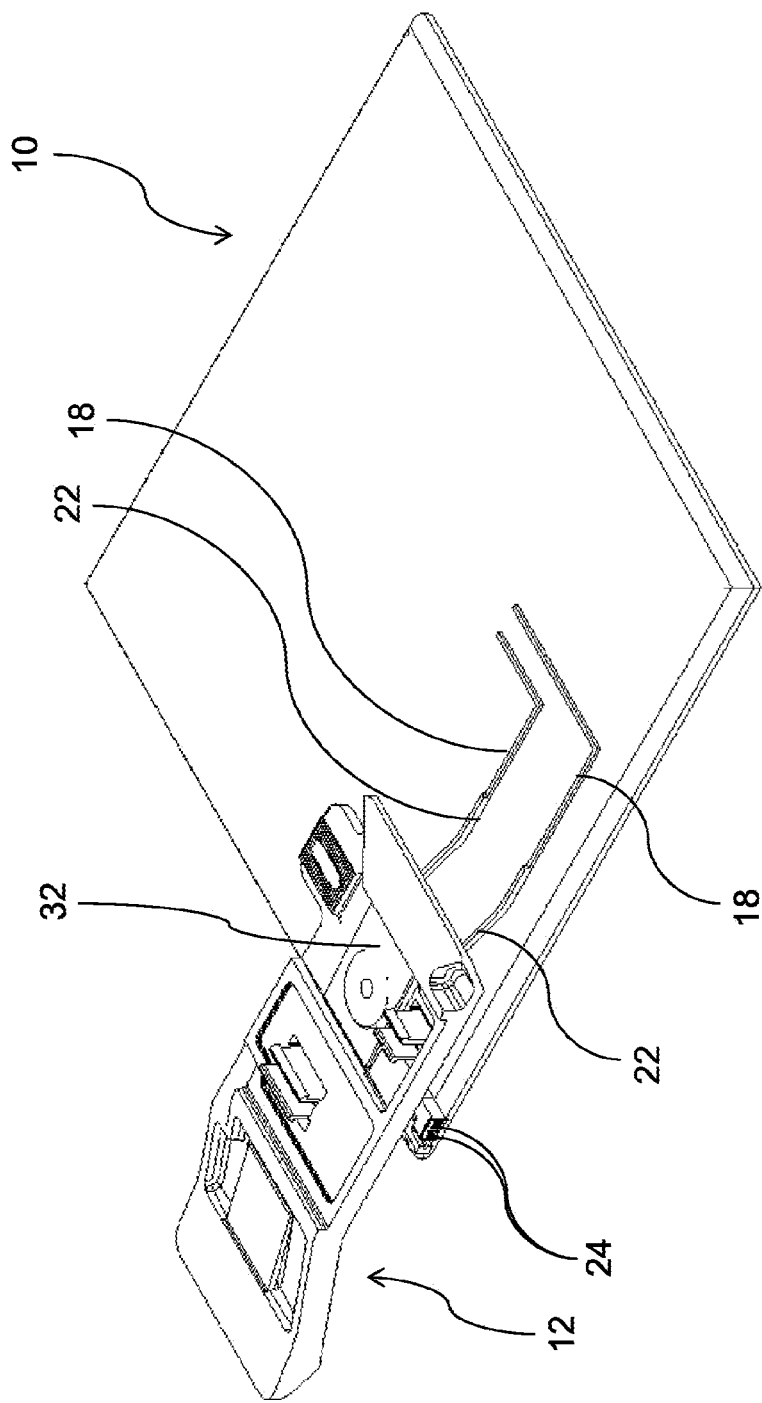
FIG. 3d is an isometric view of a third preferred embodiment of a device according to the invention in the assembled state, as a rear view.
Figure 3E:
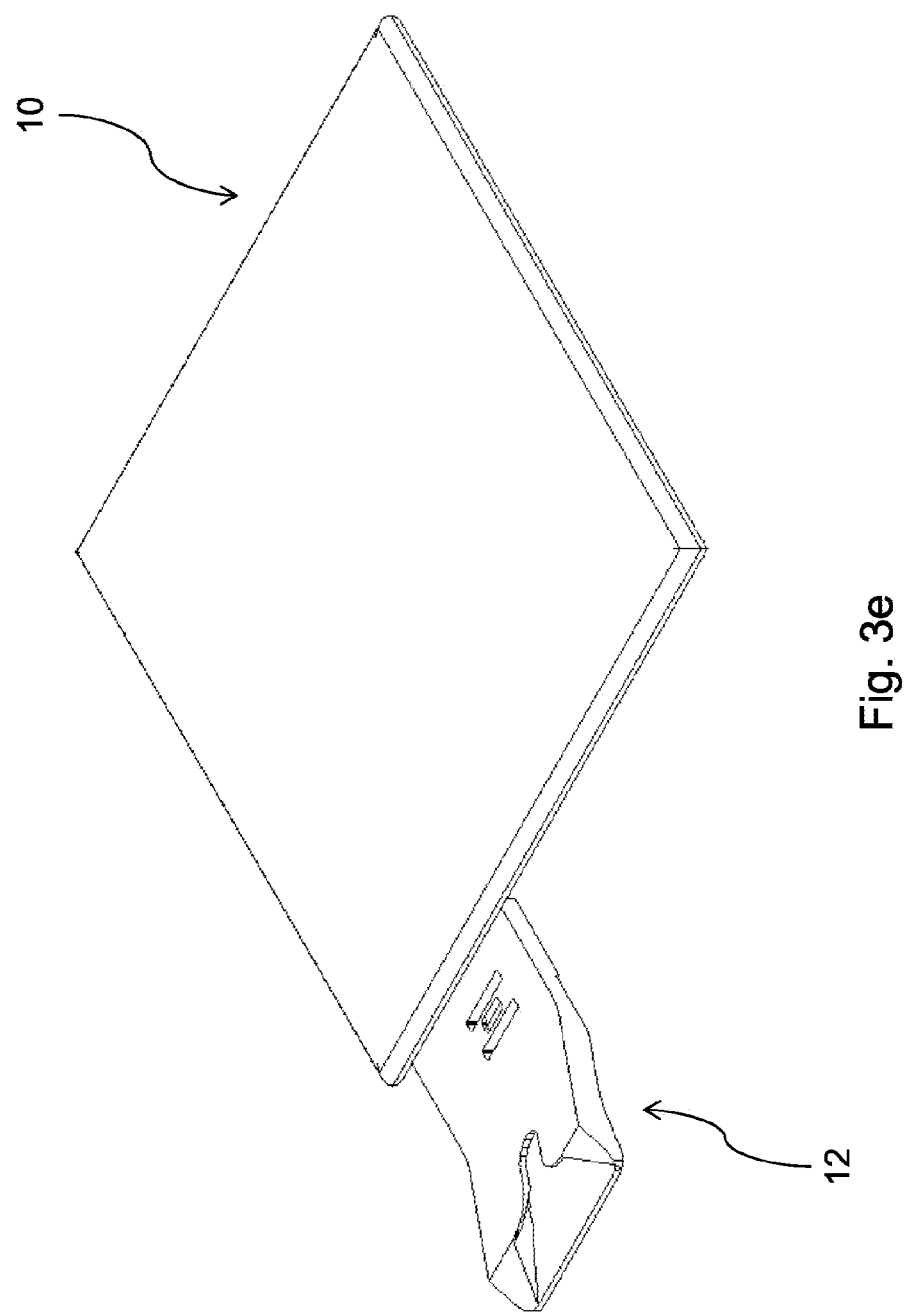
FIG. 3e is an isometric view of a third preferred embodiment of a device according to the invention in the assembled state, as a front view.

FIG. 3a finally illustrates the general mode of operation of a third preferred embodiment of a device according to the invention again as a vertical section, in addition hereto FIG. 3b and FIG. 3c illustrate a front or rear view of component parts of the third preferred embodiment of a device according to the invention. Like in the preceding two variants, also in this third preferred embodiment of a device according to the invention, a positive contact is established between a support structure 12, which on its part again is attached positive and non-positive to an aircraft structure 13, which is not visible in FIG. 3a to FIG. 3c, and on a fixing element 28 that is also not visible in FIG. 3a, wherein a facing element 10 is again disposed on the fixing element 28 and the positive engagement is created by means of an undercut vertical groove 26 on a back face 32 disposed on the support structure, which vertical groove is not visible in FIG. 3a and FIG. 3b, while again maintaining a 1.5 mm fitting tolerance in horizontal direction. In this third variant of a device according to the invention, the facing element 10 includes a number of first contacts 22 extending in the direction of translation, which contacts are elastically deformable in the shape of a bow which correspond with a same number of second contacts 24 that also extend in the direction of translation, which contacts are again attached on the support structure 12 in guide ducts 50 and during interlocking of the support structure 12 with the facing element 10 establish an electrical contact between the support structure 12 and the facing element 10. The guide ducts 50 are formed by intentional thickening of the support structure 12 and by bonding or interlocking of the second contacts 24 accommodate these in recesses that are respectively formed corresponding to the second contacts 24, after the second contacts 24 have first been fixed in a bore, which second contacts on the support structure are advantageously connected respectively on the support structure with connectors with a material-formed joint by means of SMT or THT soldering methods, or were alternatively fixed positively and non-positively by means of crimp contacts in the guide ducts 50. The first contacts 22 on the facing elements are connected respectively on one end like a fixed bearing with the facing element 10 and are connected there with facing element leads 18 not visible in FIG. 3a and FIG. 3c, while the first contacts 22 on the respective other end bear against the facing element 10 like a loose bearing. The second contacts 24 corresponding to the first contacts 22 are accommodated in guide ducts 50 on the support structure, which guide the ends of the first contacts 22 attached like a loose bearing during the positive engagement by transitory movement between the support structure 12 and the facing element 10 by means of the second contacts 24, whereas at the same time the first contacts 22 are pressed onto the second contacts 24 as a result of the bow-shaped embodiment of the first contacts 22. In a preferred refinement of this third variant of the device according to the invention the first contacts 22 on the facing element are disposed respectively on both sides of the fixing element 28 and thus facilitate symmetrical positioning and a symmetrical and thus an easier to achieve positive engagement or non-positive engagement of the first contacts 22 to the second contacts 24. As in the previous variants, FIG. 3d and FIG. 3e illustrate an assembled state of the third preferred embodiment of a device according to the invention.

Although the details of the invention were illustrated and explained closer by means of preferred embodiments, the invention is therefore not limited by the disclosed examples and other variations can be derived herefrom by a person skilled in the art without departing from the scope of the invention. It is therefore obvious that a multiplicity of possible variations exists. It is also obvious that embodiments mentioned as an example really represent merely examples, which are not to be understood in any way as limiting the scope of possible applications or the configuration of the invention for instance. The preceding specification and a description of figures rather put a person skilled in the art into the position to specifically implement the exemplary embodiments, whereby the person skilled in the art having knowledge of the disclosed inventive concept can make a variety of changes, for example regarding the function or the configuration of individual elements cited in an exemplary embodiment, without abandoning the protective scope, which is defined by the claims and their legal equivalents, such as further explanations in the description.

LIST OF REFERENCE SYMBOLS

10 Facing element;
12 Support structure;
13 Aircraft structure;
18 Facing element leads;
20 Connecting leads on the support structure;
22 First contact;
24 Second contact;
26 Undercut vertical groove;
28 Fixing element;
30 Head;
32 Back face;
34 Longitudinal groove;
36 Contact pin;
38 Sloping element;
40 Return spring;
42 Projection;
44 Shaft;
46 Connector pin;
48 Connector; and
50 Guide duct.

The invention claimed is:

1. A device for fixing and electrical contacting of a facing element of an aircraft to a support structure, the support structure attached to an aircraft structure, the device comprising a fixing device to detachably fix the facing element on the support structure and a contacting device to provide multiple electrical contacts between facing element leads and connecting leads on the support structure, wherein the fixing device is enabled to be placed into positive engagement by a transitory relative movement between the facing element and the support structure, and the contacting device comprises at least two first contacts on the facing element and the same number of second contacts on the support structure cooperating therewith, each of which is enabled to be brought to contact one another electrically during the transitory relative movement, wherein the first contacts are connected with the facing element leads on the facing element and the second contacts are connected with the connecting leads on the support structure.

2. The device according to claim 1, wherein the facing element is a facing panel.

3. The device according to claim 1, wherein
the support structure comprises a supporting plate with an undercut vertical groove, and an insertable fixing element with a head that is enabled to be brought into the undercut area is attached on the facing element,
the contacting device comprises multiple elastically protruding first contacts disposed on the head, and
the contacting device comprises second contacts disposed in a back face of the undercut vertical groove interacting with the first contacts.

4. The device according to claim 3, wherein the second contacts are shaped in a form of strips.

5. The device according to claim 3, wherein the second contacts are disposed in longitudinal grooves, the longitudinal grooves formed in the back face of the undercut vertical groove.

6. The device according to claim 3, wherein the first contacts are shaped in a form of bows.

7. The device according to claim 6, wherein the first contacts are connected with contact pins, the contact pins extend into innards of the facing element and are detachably connected there with the facing element leads.

8. The device according to claim 1, wherein
the contacting device on the support structure comprises at least one non-conductive sloping element, on which multiple adjacently disposed second contacts are attached, the second contacts are connected with the connecting leads on the support structure,
the sloping element is enabled to be moved against a retractive force transverse to translatory motion,
the first contacts are disposed on the facing element, the first contacts are enabled to be brought into contact with the second contacts during the transitory motion.

9. The device according to claim 8, wherein the sloping element comprises a return spring to produce a retractive force, the retractive force pushes the sloping element in direction of the support structure.

10. The device according to claim 8, wherein the first contacts are disposed on a projection, the projection comprises an inclined surface aligned parallel to a contact surface of the sloping element.

11. The device according to claim 8, wherein the sloping element comprises a shaft, from a free end of which contact pins connected with the first contacts project, wherein one end of the shaft and the contact pins are enabled to be connected detachably with a connector, the connector is connected with the facing element leads.

12. The device according to claim 8, wherein 2-10 second contacts are disposed on the sloping element and the same number of first contacts are disposed on the facing element.

13. The device according to claim 1, wherein
the contacting device comprises a number of first contacts on the facing element extending in a direction of translation, the first contacts designed elastically deformable in a shape of a bow as bow-shaped contacts,
on the support structure the same number of second contacts is disposed extending in the direction of translation, the second contacts disposed in guide ducts.

14. The device according to claim 13, wherein the bow-shaped first contacts are fixed respectively on one end on the facing element and on the other end bear respectively on the facing element.

15. The device according to claim 13, wherein one bow-shaped first contact and one second contact are disposed respectively on the two sides of the fixing device.

16. The device according to claim 1, wherein the facing element is a side panel.

* * * * *